INVENTOR
BORRES LAVIETES.
by Frank Waterfield
ATTORNEY.

B. LAVIETES.
WHEEL TIRE.
APPLICATION FILED FEB. 7, 1917.
1,278,482.
Patented Sept. 10, 1918.
2 SHEETS—SHEET 2.
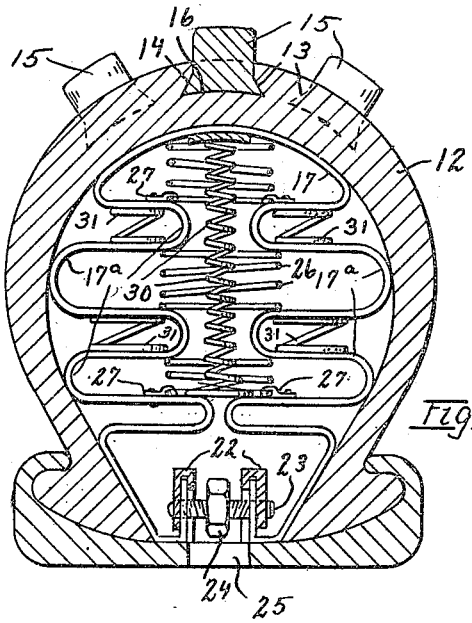
Fig. 6.
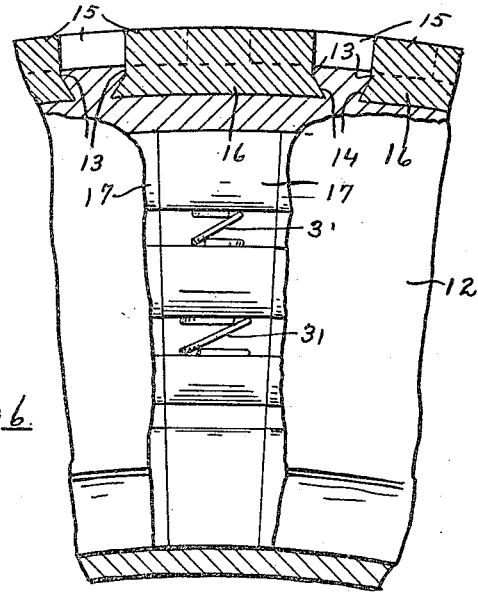
Fig. 7.
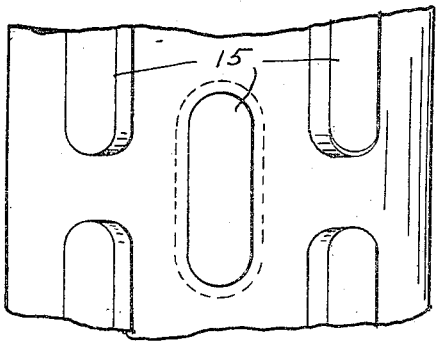
Fig. 8.
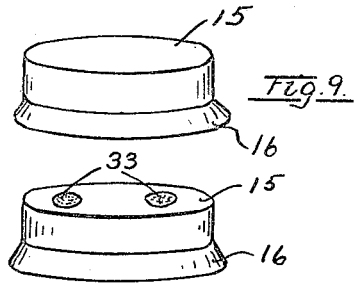
Fig. 9.
Fig. 10.
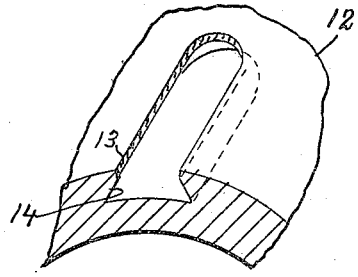
Fig. 11.
INVENTOR
BORRES LAVIETES.
by Frank Waterfield
ATTORNEY.

UNITED STATES PATENT OFFICE.

BORRES LAVIETES, OF LOS ANGELES, CALIFORNIA.

WHEEL-TIRE.

1,278,482.

Specification of Letters Patent.  Patented Sept. 10, 1918.

Application filed February 7, 1917.  Serial No. 147,040.

*To all whom it may concern:*

Be it known that I, BORRES LAVIETES, a citizen of the United States, residing at the city of Los Angeles, in the county of Los Angeles and State of California, have invented new and useful Improvements in Wheel-Tires, of which the following is a specification.

Tires for automobiles and other like vehicles are principally made of rubber and these tires so made are expensive, are relatively short lived, are extremely liable to slip or skid on wet pavements and pneumatic tires are liable to be cut or punctured in use thus impairing or destroying their efficiency.

My invention relates to improvements in tires for the wheels of automobiles and other vehicles in which a casing of fabric, leather, rubber or other suitable material is employed to inclose an interior structure and the object thereof is to provide a strong and durable tire which will be proof against puncture or the evil results therefrom and which possesses the requisite amount of flexibility and elasticity and in which the wearing surface or portions of the tire can be replaced when desired.

Another object of my invention is to produce a tire which, while possessing the advantages of a rubber tire, will also be durable and free from the objections above noted with respect to rubber tires.

A further object is to provide a tire provided with detachable spurs or raised portions which portions form the wearing surface of the tire which raised portions can be removed when worn or injured and replaced with new portions thus making the tire practically everlasting.

While I have shown and will describe the preferred form of my invention it will be understood that various changes and rearrangement of parts may be made without departing from the spirit of my invention.

I accomplish the above and other objects as will appear hereinafter by the device described herein and illustrated in the accompanying drawings forming a part hereof in which:

Figure 1 is a transverse section of my tire in its position of use.

Fig. 2 is a central longitudinal section of a portion of a tire with parts in elevation and partly broken away for clearness of illustration.

Fig. 3 is a side elevation of a portion of a wheel and tire partly broken away with the anti-skid plugs and plug sockets omitted.

Fig. 4 is a top plan of a portion of the interior structure.

Fig. 5 is a similar view of a modified form.

Figure 6:
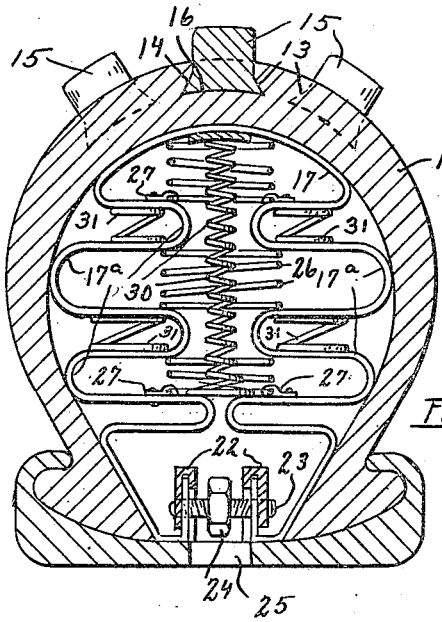
Fig. 6 is a view similar to Fig. 1, of a modified form of my tire more particularly designed for heavy work.
Figure 7:
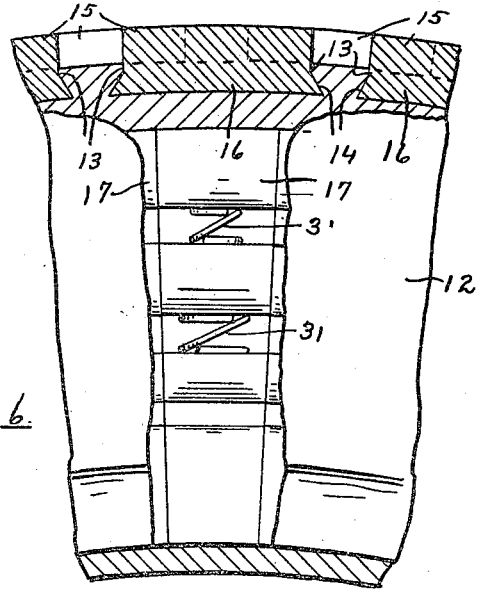
Fig. 7 is a longitudinal section of a portion of the tire shown in Fig. 6, partly in elevation.
Figure 8:
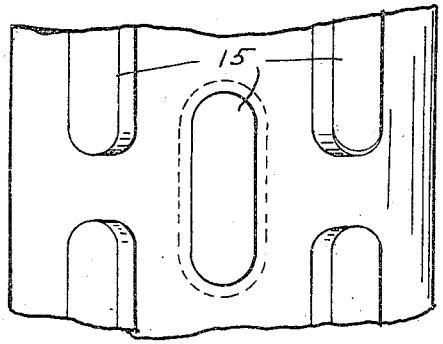
Fig. 8 is a top plan of Fig. 6.
Figure 9:
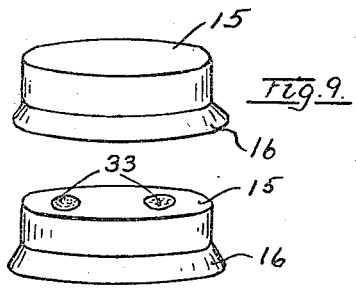
Fig. 9 is a perspective view of one of the spurs used with my tire.

In the drawings 10 represents the spokes, and 11 the felly of a vehicle wheel. 12 is the outer casing which is of ordinary form, excepting that it is made of fabric similar to braided belting, although it may be made of any other suitable material, and is held positioned in the usual way.

In the outer periphery of this casing 12 I provide a plurality of recesses 13 the lower portion of which is enlarged as at 14 and in each of these recesses I mount a spur or plug 15 the enlarged head 16 of which is received in the enlarged portion 14 of the recesses. These spurs or plugs are secured in said recesses in any suitable manner. Mounted within casing 12 and extending radially around the felly of the wheel are a plurality of resilient spring members 17. These spring members are formed of strips of spring metal, preferably steel, of sufficient thickness to properly sustain the maximum load it is desired to carry and are bent centrally of their length, into an arc to coincide with the inner surface of the casing for a distance equal to the portion of the tire which contacts with the ground when the tire is in use and the free ends are then bent to form a series of pairs of oppositely disposed loops 17ᵃ from the arc to near the rim of the wheel, the free ends of said strips being bent inwardly to rest upon said rim and then bent to extend upwardly a short distance. These spring members are of sufficient width to abut against each other and thus fill up the space within the casing. The tread portion of each spring has formed therein a rectangular groove or aperture, 18 and a resilient band 19 is mounted beneath the tread portion of spring members 17 and is provided with upwardly extending lugs 20 of the same configuration as the grooves in the spring members which lugs are received in said grooves and serve to hold the said springs positioned. The free ends of each spring are turned upwardly at 21 and the upturned ends are connected together longitudinally by bands or hoops 22 which are formed to fit over the top of said upturned ends. At intervals around the said hoops 22 I connect them together by means of a plurality of adjusting screws 23 which are provided with right and left hand threads so that as said screws are rotated by means of the nut portion 24 the ends of said springs are drawn together or spread apart according to the direction the screws are rotated and provides means for positioning the interior portion within the casing. A slot 25 is provided through the felly of the wheel for the entrance of a wrench to operate the screws 23. To provide greater strength without sacrificing any of the resiliency I mount coil springs 26 between the inwardly opening loops 17ª each spring comprising a plurality of short coils connected together and each spring being held positioned at its ends by clamps 27 secured to loops 17ª. While I have shown only one spring 26 it will be understood that I do not limit myself to such number but may use more if desirable or I may omit their use entirely.

In Fig. 5 I have shown every other member 17 reversed so that the grooves in each pair of said members register each with the other, and the upwardly extending lugs on band 19 are enlarged so as to fill the recesses thus formed, and accomplish the same result as is accomplished by my preferred form shown in Fig. 4.

In positioning the studs within the recesses in the outer casing the recesses will first be coated with cement and the enlarged lower ends of the studs also treated to a coat of cement. By squeezing the casing transversely the recesses will be spread or enlarged and the studs can then be easily forced into position therein and releasing the casing and allowing the cement to dry secures said studs in place. The worn out studs will be removed in a like manner.

In Fig. 6 I have shown my tire as adapted for use where it is desired to carry heavy loads. This form is similar in all respects to that heretofore described except that I provide an auxiliary load coil spring 30 mounted within springs 26, the upper end thereof bearing against the under side of band 19 and the lower end being enlarged and resting upon the lowermost pair of loops 17ª, and auxiliary coil springs 31 between the outwardly opening loops of spring 17. In Figs. 6 to 9 inclusive I have shown another form of anti-skid plug. While I have shown my anti-skid plugs in use with my tire it will be understood that these plugs may be used with any of the present forms of pneumatic tires or may be omitted if desired.

Figure 10:
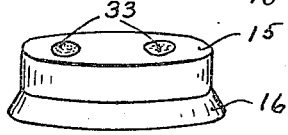
Fig. 10 is a similar view to Fig. 9, of another form of spur.

In Fig. 10, I have shown a modified form of anti-skid spur. In this form I provide friction plugs 33 of fabric or other suitable slow wearing material, which are vulcanized in the spur near each end thereof, and provide a more substantial wearing surface, thereby increasing the life of said spur without materally altering the resiliency thereof. Otherwise these spurs are similar to Fig. 9.

Figure 11:
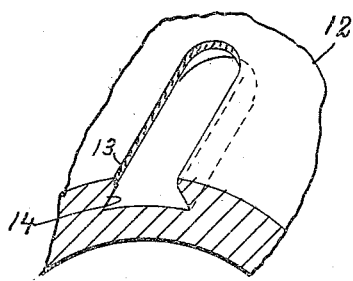
Fig. 11 is a perspective view of a fragment of the outer casing showing the method of securing the spurs thereto.

In Fig. 11 I have shown an enlarged fragment of my tire casing 12, and a portion of one of the recesses 14 for the anti-friction spurs 15.

Having described my invention what I claim is.

1. A wheel tire comprising an outer casing; a plurality of transverse radially extending springs mounted within said casing said springs having their lateral portions corrugated and their free ends bent inwardly toward each other and then upwardly a short distance and spaced apart; retaining rings mounted upon and connecting the ends of said springs; coil springs mounted within the corrugations of said radial springs; and means connecting said retaining rings adapted to vary the spacing therebetween.

2. In a vehicle wheel the combination of a felly; a rim on said felly; an outer casing mounted on said rim; a plurality of transverse radially extending springs mounted within said casing, said springs having their lateral portions corrugated and their free ends bent inwardly toward each other to rest upon said rim and then upwardly a short distance and spaced apart; a retaining ring mounted upon and connecting one of the free ends of each of said springs; a retaining ring mounted upon and connecting the other ends of said springs; a plurality of adjusting studs connecting said retaining rings at spaced intervals around said rings whereby the free ends of said springs may be moved toward or away from each other; and coil springs mounted between the corrugations of said springs.

3. A wheel tire comprising an outer fabric casing; a plurality of abutting transverse radially extending arched springs mounted within said casing, said springs having their lateral portions corrugated, and their free ends bent inwardly toward each other and then upwardly a short distance; retaining rings connecting the longitudinally adjacent ends of said springs; coil springs between the inner and outer corrugations of said radial springs; a tread ring connecting the arched portions of said springs centrally thereof; in combination with means to vary the space between the upturned free ends of said radial springs.

4. A wheel tire comprising an outer fabric casing; a plurality of radially extending arched springs mounted within said casing transversely thereof with their free ends extending inwardly, said free ends being bent inwardly toward each other and then upwardly a short distance and being normally spaced apart; retaining rings connecting the longitudinally alined free ends of said springs; a tread ring connecting the arched portions of said springs centrally thereof; in combination with means to vary the spacing between the free ends of said arched springs.

5. In a resilient wheel a felly; a rim on said felly having longitudinally extending, opposed grooves in the sides thereof; an outer casing mounted on said rim, said casing being substantially U-shaped in cross section and being provided with an annular bead on the outer face of each of its free edges adapted to be received in the grooves of said rim; a plurality of transverse, radially extending, springs mounted within said casing, the lateral portions thereof being corrugated, and having their free ends bent inwardly toward each other and then upwardly and spaced apart; a tread ring connecting the central portions of said springs, coil springs within the inner corrugations of said transverse springs; means to vary the spacing between the free ends of said transverse springs; and means to operate said last means.

6. A resilient wheel comprising a felly; a rim on said felly having an outwardly extending flange at each side thereof and grooves in the opposed faces of said flanges; a substantially U-shaped casing mounted on said rim with its free edges resting thereupon each of said free edges being provided on its outer face with an annular outwardly extending bead adapted to be mounted in the grooves of the rim; a plurality of radially extending arched springs mounted within said casing transversely thereof, the lateral portions of said springs being bent to form a plurality of alternate inwardly and outwardly opening opposed loops for a portion of their length and then bent downwardly and inwardly at an angle and then inwardly toward each other and then upwardly a short distance and spaced apart, the closed portions of the inwardly opening loops being adapted to bear against the inner face of said casing, and the angular portions being adapted to bear against the inner face of the casing opposite the beads, a tread ring connecting the arched portion of said springs; retaining rings connecting the longitudinally abutting ends of said springs; adjustable connections between said retaining rings adapted to move said rings toward or away from each other to permit the beads of the casing to be positioned within or withdrawn from the grooves of said rim and to hold said beads positioned against accidental displacement; and means to operate said adjustable connections.

7. In a resilient wheel the combination of a rim; a plurality of arched springs mounted upon said rim; a connecting tread ring centrally engaging said arched springs; retaining rings connecting the free ends of said arched springs; means to adjust the distance between said retaining rings; and a fabric envelop in which said members are mounted.

8. In a resilient wheel the combination of a rim; a shoe on said rim; a plurality of resilient loops within said shoe; a connection for the central portions of said loops; connections for the free ends of said loops; and coil springs mounted within said loops.

In witness that I claim the foregoing I have hereunto subscribed my name this fifth day of July, 1915.

BORRES LAVIETES.

Witness:
FRANK WATERFIELD.

Copies of this patent may be obtained for five cents each, by addressing the "Commissioner of Patents, Washington, D. C."